(No Model.)
W. H. CURD.
WHEEL.
No. 346,401. Patented July 27, 1886.
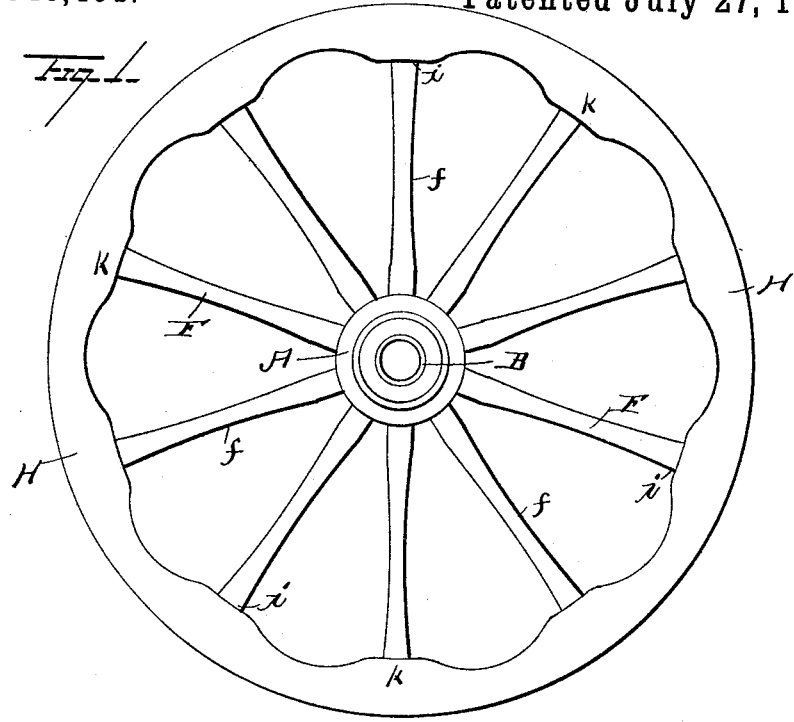
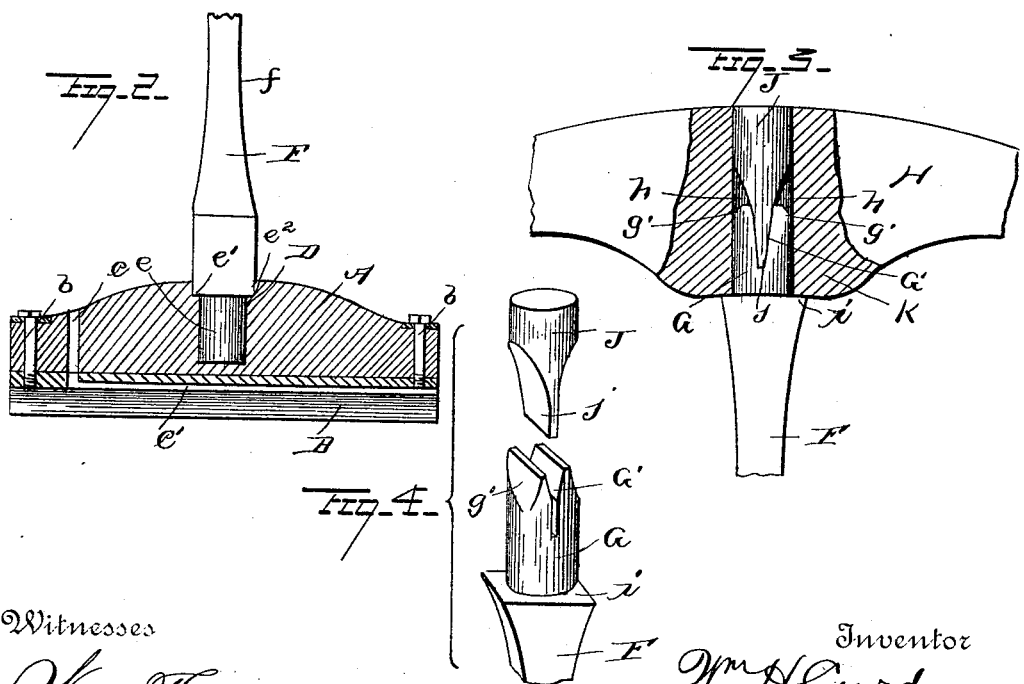
Witnesses
Wm T. Gill
W. F. Burchard
Inventor
Wm H. Curd
By his Attorneys
C. A. Snow & Co.

UNITED STATES PATENT OFFICE.

WILLIAM HENRY CURD, OF LICK RUN, VIRGINIA.

WHEEL.

SPECIFICATION forming part of Letters Patent No. 346,401, dated July 27, 1886.

Application filed May 24, 1886. Serial No. 203,144. (No model.)

*To all whom it may concern:*

Be it known that I, WILLIAM HENRY CURD, a citizen of the United States, residing at Lick Run, in the county of Botetourt and State of Virginia, have invented a new and useful Improvement in Wheels, of which the following is a specification.

My invention relates to improvements in vehicle-wheels especially designed for use on wheelbarrows; and it consists of the peculiar combination and novel construction and arrangement of the various parts for service, substantially as hereinafter fully set forth, and particularly pointed out in the claim.

The object of my present invention is to provide novel means for securing the outer and inner ends of the spoke in the felly and hub of the wheel in such a manner that all oil, water, and other liquids and matter are prevented from entering the socket of the spoke and working the latter loose, and to provide an improved wheel which shall be simple and strong in construction, not liable to become easily broken or give way under a heavy load when imposed thereon, and which shall be cheap and inexpensive of manufacture.

In the accompanying drawings, which illustrate a vehicle-wheel embodying my invention, Figure 1 is a side elevation. Fig. 2 is a vertical central sectional view through the inner end of the spokes and a portion of the hub of the wheel. Fig. 3 is a like view through the outer end of the spoke, the felly, and the key or plug; and Fig. 4 is a detached view of the spoke and key in perspective.

Referring to the drawings, in which like letters of reference denote corresponding parts in all the figures, A designates the hub of my improved vehicle-wheel, which is preferably made of a suitable hard wood, and this hub is provided with a central hollow box or bearing, B, of metal, which is secured rigidly in place by means of bolts $b$, that can be detached to permit the box to be removed from the wheel when it becomes worn out through friction and wear between the same and the axle that is journaled therein. A vertical opening, $c$, is made or formed through the hub at one side of the latter, the inner extremity of which opens into a channel, $c'$, of the metallic box, so that oil can be poured into the opening $c$ and conducted into the interior of the box without requiring the axle to be removed to lubricate the latter, as will be readily understood.

The hub is provided with a series of radial sockets, D, in which are fitted the inner ends of the radial spokes of the wheel, as is obvious. These sockets D of the hub are made round or circular in cross-section at the inner ends, and at their outer ends they are made square or of any other preferred angular form, to prevent the inner end of the spoke that is fitted therein from turning or rotating. The inner end of the spoke is provided with a tenon, $e$, which is made circular in cross-section to fit snugly in the corresponding portion of the socket, and the spoke is made square or of other angular form to fit the angular outer end of the socket. It will thus be seen that a shoulder, $e'$, is provided between the outer end of the spoke and the tenon thereof, and this shoulder bears on a corresponding shoulder, $e^2$, intermediate of the circular and angular portions of the socket D, and an increased area of surface is thus provided for the contact between the inner end of the spoke and the hub, which offers greater resistance to the movement of the inner end of the spoke, and thereby prevents displacement thereof, as well as preventing the admission of the oil or lubricant from the box of the wheel, and water or other matter.

The spoke F is made substantially square in cross-section at its inner and outer ends, as described, and on its sides it is curved or inclined, as shown at $f$, to permit the spoke to spring when it is fitted to the felly, and the outer end of the spoke is further provided with a reduced tenon, G. This tenon G is made circular in cross-section near its point of juncture with the body of the spoke, and the outer end thereof is beveled or inclined at its periphery, as at $g'$, to permit the same to be brought into contact with the inner walls of the socket $h$ of the felly H when the tenon is forced laterally under the force of a key or plug, J. The extreme outer end of the tenon is split or divided longitudinally by a V-shaped or tapering incision, as at G', and in this split portion of the tenon is adapted to be driven the inner tapered or wedge-shaped end, $j$, of a key or plug, J. The socket $h$ of the felly is made circular in cross-section to correspond with the shape of the tenon G, and when the key is driven into the socket $h$ the outer end of the key lies flush with the periphery or tread of the wheel. By providing the split tenon G and the tapered key the tenon is very firmly and rigidly held in the felly, and prevented from movement and accidental displacement therein, and water and any other liquids or matter are effectually excluded, the shoulder $i$, between the tenon and the squared portion at the outer end of the spoke, bearing against the inner face of the felly.

The felly is enlarged at the points where the spokes enter the sockets therein, as at $k$, and the lines on opposite sides of the enlargements are curved or inclined to present an attractive appearance, and by means of these enlargements the inherent strength of the wood is preserved, and the wheel is materially braced and strengthened at the points where the greatest strain and weight come on the periphery thereof.

It will thus be seen that I provide an improved wheel which is very simple and strong in its construction, as well as durable and exceedingly cheap, and the wheel can be used for any other purpose than that hereinbefore stated—to wit, upon wheelbarrows. It can be applied to all light or heavy vehicles—as, for instance, buggies, light-draft wagons, &c.

Having thus fully described my invention, what I claim as new, and desire to secure by Letters Patent, is—

The combination of a felly having a socket, $h$, a spoke provided with a tenon, G, at one end, fitting in the socket, and having a longitudinally-tapering incision formed therein, and the outer beveled sides, $g'$, and a plug, J, fitting snugly in the socket $h$ and wholly filling the outer portion thereof, and having the tapered end $j$ forced into the tapered incision in the spoke-tenon to spread the split ends of the tenon away from each other and the beveled sides $g'$ into contact with the walls of the socket $h$, substantially as described, for the purpose set forth.

In testimony that I claim the foregoing as my own I have hereto affixed my signature in presence of two witnesses.

WILLIAM HENRY CURD.

Witnesses:
J. BENSON SIMPSON,
W. J. PRICE.